US012591919B2

(12) United States Patent
Jetty et al.

(10) Patent No.: US 12,591,919 B2
(45) Date of Patent: Mar. 31, 2026

(54) EDGE WEIGHT BASED COMPUTER MODELS FOR ITEM RECOMMENDATION

(71) Applicant: Walmart Apollo, LLC, Bentonville, AZ (US)

(72) Inventors: Rajasekhar Jetty, Cumming, GA (US); Neeraj Sharma, Dallas, TX (US); Ieshan A. Vaidya, Addison, TX (US); Yogananda Domlur Seetharama, Missisauga (CA); Chi-san Ho, Allen, TX (US); Ankit Gupta, Austin, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 114 days.

(21) Appl. No.: 18/428,534

(22) Filed: Jan. 31, 2024

(65) Prior Publication Data

US 2025/0245722 A1      Jul. 31, 2025

(51) Int. Cl.
    *G06Q 30/0601*      (2023.01)
    *G06Q 30/02*        (2023.01)
    *G06Q 30/0201*      (2023.01)
(52) U.S. Cl.
    CPC ..... *G06Q 30/0631* (2013.01); *G06Q 30/0201* (2013.01); *G06Q 30/0281* (2013.01)
(58) Field of Classification Search
    CPC .......... G06Q 30/0631; G06Q 30/0201; G06Q 30/0281
    See application file for complete search history.

(56) References Cited

U.S. PATENT DOCUMENTS 8,015,140 B2    9/2011   Kumar et al.
8,050,984 B2    11/2011  Bonner et al.
(Continued)

FOREIGN PATENT DOCUMENTS

CN          116244501 A      6/2023

OTHER PUBLICATIONS

A location-aware recommender system for mobile shopping environments,. Wan-Shiou Yang, Hung-Chi Cheng, Jia-Ben Dia. Expert Systems with Applications, vol. 34, Issue 1, 2008, pp. 437-445. Retrieved via ScienceDirect. (Year: 2008).*
(Continued)

*Primary Examiner* — Michael Misiaszek
(74) *Attorney, Agent, or Firm* — Foley IP Law, PLLC

(57)      ABSTRACT

In some embodiments, systems and methods are provided herein useful to generating item recommendations. In some embodiments, a system for item recommendation may include a memory storing an item recommendation model trained using dense representations for items, the dense representations generated based on an item interaction graph including nodes corresponding to items for sale in a retail facility, edges connecting the nodes, and edge weights for the edges, wherein the edge weights are related to item selection sequence of the items, and a control circuit coupled to the memory, the control circuit configured to receive an indication of an item selection by a user in the retail facility, generate a recommendation for a suggested next item based on using the item selection as an input of the item recommendation model, and cause the one or more suggested next best items to be presented to the user for potential selection.

16 Claims, 8 Drawing Sheets

(56) References Cited

U.S. PATENT DOCUMENTS

| | | | | |
|---|---|---|---|---|
| 11,538,083 | B2 | 12/2022 | Sewak et al. | |
| 12,051,099 | B2 * | 7/2024 | Malhotra | G06N 3/09 |
| 2017/0372401 | A1 * | 12/2017 | Wang | G06Q 30/0631 |
| 2022/0058714 | A1 * | 2/2022 | Chen | G06N 3/084 |
| 2022/0114644 | A1 * | 4/2022 | Jha | H04L 9/0643 |
| 2022/0292571 | A1 * | 9/2022 | Kovalev | G06Q 30/0631 |
| 2023/0267527 | A1 | 8/2023 | Walker et al. | |
| 2025/0069130 | A1 * | 2/2025 | Li | G06Q 30/0631 |

OTHER PUBLICATIONS

Unknown, "Smart Suggestion Algorithm", Scan&Go, https://scanandgo.com/knowledge-base/scale-up/smart-suggestion-algorithm/, downloaded Mar. 13, 2024, 3 pages.
Unknown, "Shrinkage and Loss Prevention in Retail Stores," https://scanandgo.com/knowledge-base/getting-started/shrinkage-and-loss-prevention/, downloaded Mar. 13, 2024, 5 pages.

* cited by examiner

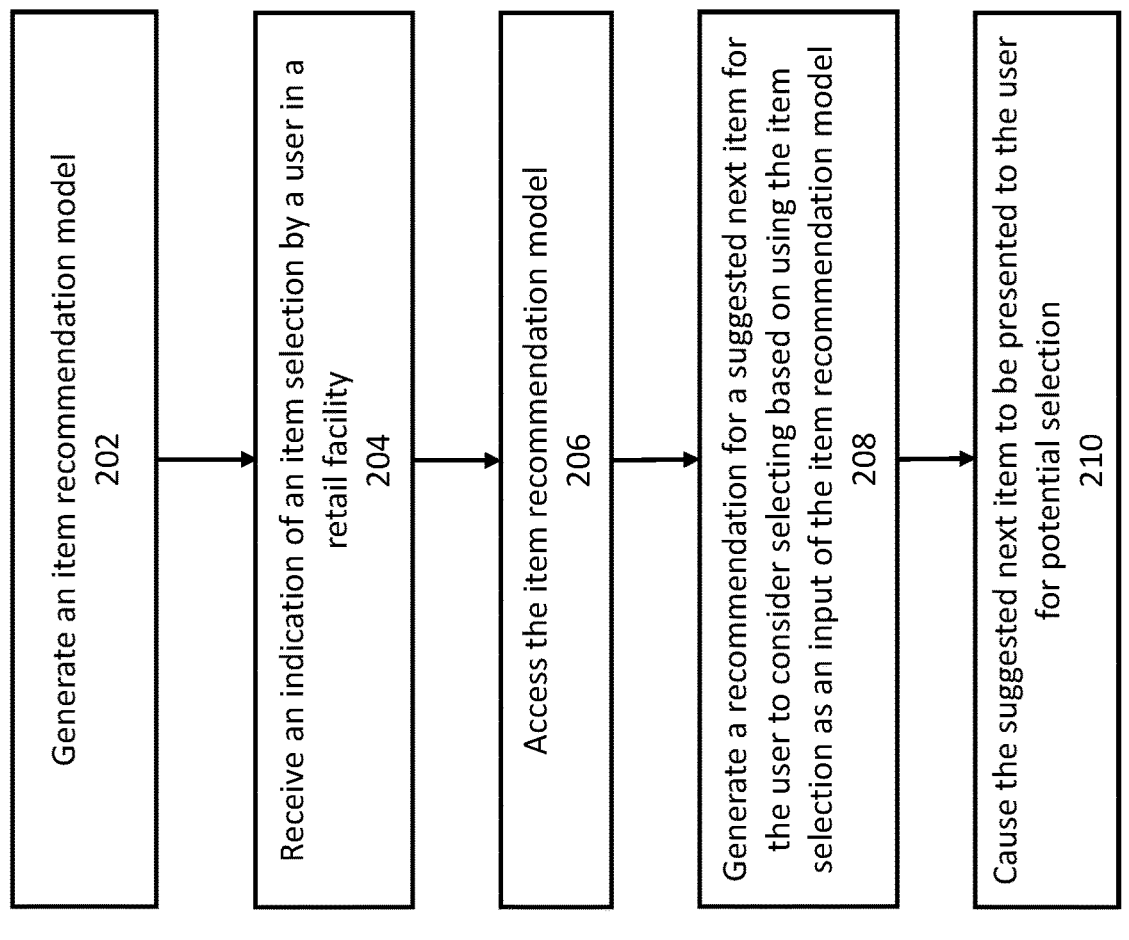

Generate an item recommendation model
202

Receive an indication of an item selection by a user in a retail facility
204

Access the item recommendation model
206

Generate a recommendation for a suggested next item for the user to consider selecting based on using the item selection as an input of the item recommendation model
208

Cause the suggested next item to be presented to the user for potential selection
210

202

Generate an item interaction graph for items for sale
222

Generate dense representations for the items based on the item interaction graph
224

Compute distances between the dense representations of the items for sales
226

Sort the results of distance computing based on closeness
228

Identify neighbors of each source item based on the closeness
230

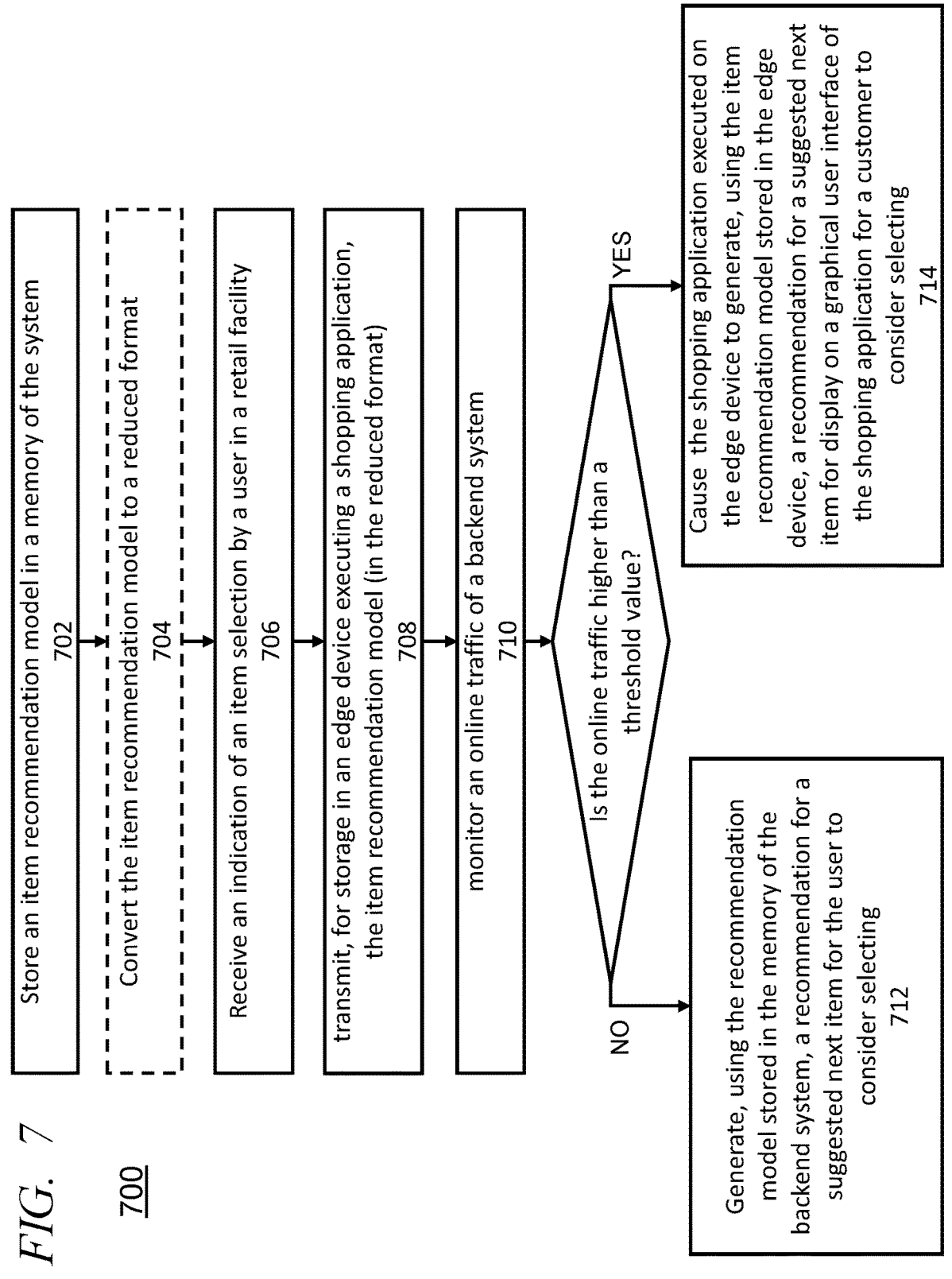

Store an item recommendation model in a memory of the system
702

Convert the item recommendation model to a reduced format
704

Receive an indication of an item selection by a user in a retail facility
706 transmit, for storage in an edge device executing a shopping application, the item recommendation model (in the reduced format)
708 monitor an online traffic of a backend system
710

Is the online traffic higher than a threshold value?

NO

YES

Generate, using the recommendation model stored in the memory of the backend system, a recommendation for a suggested next item for the user to consider selecting
712

Cause the shopping application executed on the edge device to generate, using the item recommendation model stored in the edge device, a recommendation for a suggested next item for display on a graphical user interface of the shopping application for a customer to consider selecting
714

EDGE WEIGHT BASED COMPUTER MODELS FOR ITEM RECOMMENDATION

TECHNICAL FIELD

This invention relates generally to systems for computer models for item recommendation, and specifically to utilizing an edge weight model for item recommendations.

BACKGROUND

Typically, to complete a retail transaction at a physical retail store, the customer brings selected items for purchasing to a checkout point such as a checkout terminal or a cashier. In some instances, retail stores provide a mobile shopping application for self-checkout at the retail stores. Some mobile shopping applications for in-store use provide a user interface for customers to interact with products in store and item recommendation is often provided within the user interface for users to facilitate shopping.

BRIEF DESCRIPTION OF DRAWINGS

Disclosed herein are embodiments of systems and methods pertaining to generating item recommendations for retail services. This description includes drawings, wherein:

FIG. 2A is a flowchart depicting a method for item recommendation in accordance with some embodiments.

FIG. 7 is a flowchart depicting a method for item recommendation in accordance with some embodiments.

Figure 1:
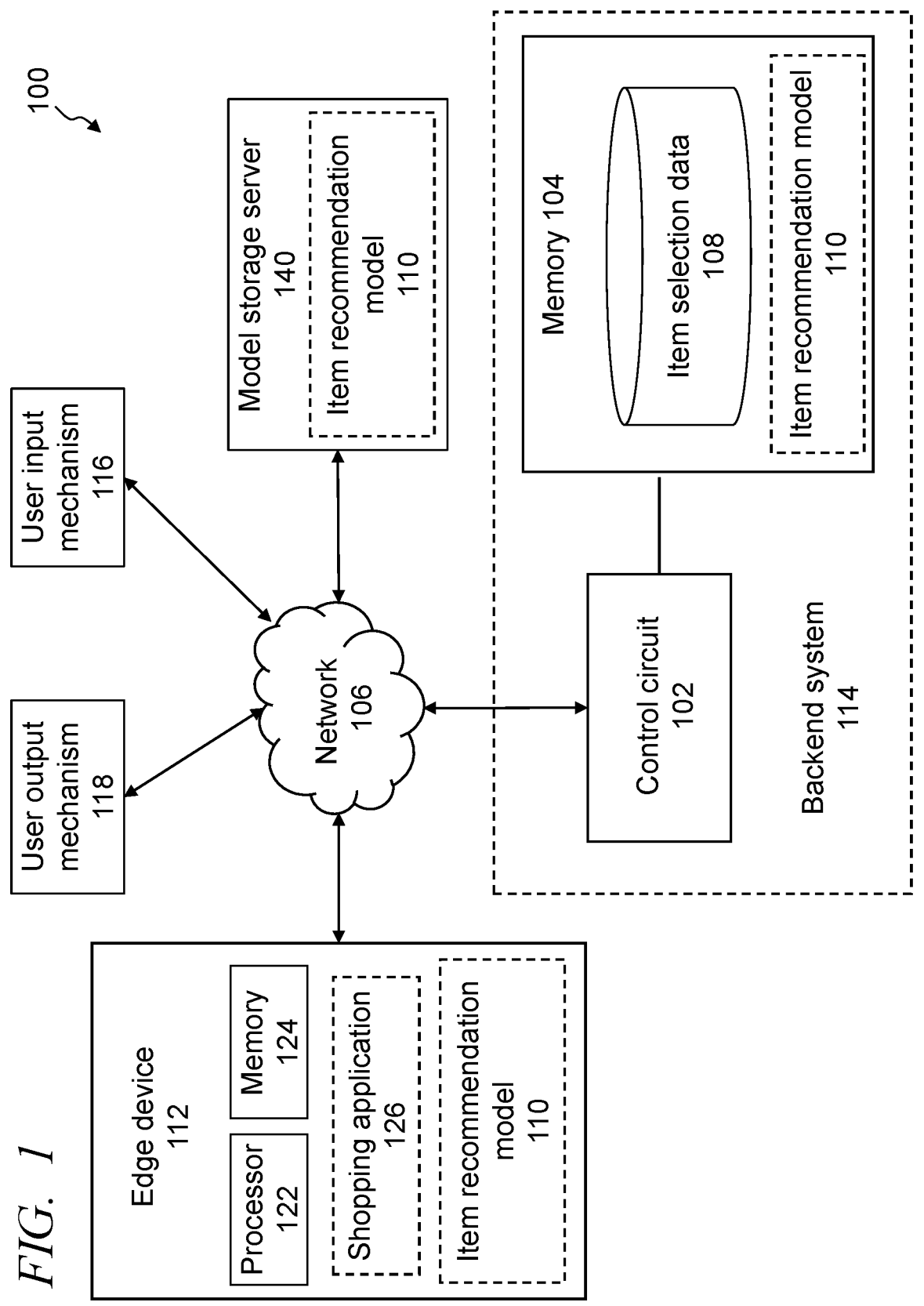
FIG. 1 is a block diagram of a system for item recommendation in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to providing item recommendations to customers. In some embodiments, a system for item recommendation comprises a memory storing an item recommendation model trained using dense representations for items for sale in a retail facility, the dense representations are generated based on an item interaction graph comprising nodes corresponding to items for sale in a retail facility, edges connecting the nodes, and edge weights for the edges, wherein the edge weights are related to item selection sequence of the items for sale in the retail facility, and a control circuit coupled to the memory, the control circuit configured to receive an indication of an item selection by a user in the retail facility, generate a recommendation for a suggested next item based on using the item selection as an input of the item recommendation model, and cause the suggested next item to be presented to the user for potential selection.

Retail services and e-commerce platforms may provide item recommendations based on using item location information and/or a user (shopper) location information. However, store layout and item location may be changed regularly, and, in many retail stores, store layout and item location mapping are not digitized. Further, simply recommending the items in a close location without knowing affinity between items may not provide a good experience to users.

Systems and methods according to the disclosure may provide good experience in providing a recommendation for a suggested next item to users in a retail facility. Systems and methods in accordance with some embodiments may provide item recommendations without using software for mapping the items in the retail facility or without using a sensor or computer vision to approximate customer locations. Systems and methods are provided that may reduce the latency in providing item recommendations. In some embodiments, systems and methods are provided that may reduce overloading a backend system and effectively manage the traffic of the system.

Various embodiments and examples of systems, devices, apparatus, and methods are described herein. Exemplary FIGS. 1-7 are provided to illustrate various embodiments. It is noted that when describing certain embodiments, certain features may be shown in one or more of FIGS. 1-7.

FIG. 1 is a block diagram of a system 100 for item recommendation in accordance with some embodiments. The system 100 may include a control circuit 102 and a memory 104, an edge device 112, a user input mechanism 116, and a user output mechanism 118. The user input mechanism 116 and the user output mechanism 118 may be part of the edge device 112. The edge device 112 may include a shopping application 126 stored in a memory 124 of the edge device 112 and executed by a processor 122 of the edge device 112. In some embodiments, the processor 122 and the memory 124 of the edge device 112 may be small enough to be used for a portable electronic device such as a smart phone. In some embodiments, the memory 124 of the edge device 112 may be, but is not limited to 8 GB, 16 GB, 24 GB, or 32 GB memory. In some approaches, the edge device 112 may be a mobile electronic device used by a user such as mobile phones, tablets, wearable devices. The control circuit 102, the edge device 112, the user input mechanism 116, and the user output mechanism 118 may be communicatively connected via a network 106. The network 106 can be any suitable type of network, such as an intranet and/or an internet (e.g., the Internet). Accordingly, some, none, or all of these components can be local to and/or remote from one another.

The memory 104 may provide storage of item selection data 108 and an item recommendation model 110. In some embodiments, the item recommendation model 110 may be a model trained using dense representations for items for sale in a retail facility generated based on an item interaction graph (details of the item recommendation model 110 will be discussed below). The item interaction graph may be generated based on using the item selection data 108.

The item selection data 108 may include the information collected about users' visits and behaviors during users' shopping journey in a retail facility. The item selection data 108 may be collected via the shopping application 126 installed on the edge device 112. In some embodiments, the shopping application 126 may be a shopping app (e.g., SAM'S CLUB's shopping app with "SCAN&GO" software) installed on a customer's mobile electronic device. The item selection data 108 may include, but not be limited to, information of selected items, time stamp information associated with users' item selections, visit information associated with the item selections, shopping cart information (basket information) associated with the item selections, transaction information associated with the item selections.

In some embodiments, item selection data 108 may be collected when users add items to a shopping cart. In some embodiments, item selection data 108 may be collected when users add items to a shopping cart of the shopping application 126 by scanning, using an optical sensor such as a camera of the user's mobile electronic device to which the shopping application 126 installed, items (e.g., barcodes on items) to be purchased. For instance, a user may put all items scanned and added to the shopping cart of the shopping application 126 in a physical shopping container in a retail store. In this scenario, the list of items in the shopping cart of the shopping application 126 may be the same as the list of the items in the physical shopping container. In some embodiments, items may be scanned and added to the shopping cart of the shopping application 126 when a user picks each item from the item placement areas of each item in the retail facility and thus the selection sequence of items may be related to affinity and spatial relation of the selected items.

The control circuit 102 is configured, for example by using corresponding programming, to carry out one or more of the steps, actions, and/or functions described herein. The control circuit 102 may comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to effect one or more of the steps, actions, and/or functions described herein.

The control circuit 102, for example, may comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 102 is configured (for example, by using corresponding programming as will be well understood by those skilled in the art) to carry out or send signals to carry out one or more of the steps, actions, and/or functions described herein.

In some embodiments, the control circuit 102 operably couples to the user input mechanism 116 and the user output mechanism 118 to receive information and/or instructions from a user and/or provide information to a user. The user input mechanism 116 may include but be not limited to keyboards and keypads, cursor-control devices, touch-sensitive panels, speech-recognition interfaces, gesture-recognition interfaces, and so forth. The user output mechanisms 118 may include but are not limited to visual displays, audio transducers, printers, and so forth.

In some embodiments, the control circuit 102 may operably couple to the memory 104. In some embodiments, the memory 104 may be integral to the control circuit 102. In some embodiments, the memory 104 may include a volatile and/or non-volatile memory. In some embodiments, the memory 104 may include a random-access memory (RAM). The memory 104 may serve to store computer instructions that, when executed by the control circuit 102, cause the control circuit 102 to behave as described herein. In some embodiments, the memory 104 may serve, for example, to non-transitorily store computer instructions. As used herein, this reference to "non-transitorily" will be understood to refer to a non-ephemeral state for the stored contents (and hence excludes when the stored contents merely constitute signals or waves) rather than volatility of the storage media itself and hence the may include both non-volatile memory (such as read-only memory (ROM) as well as volatile memory (such as an erasable programmable read-only memory (EPROM).

The control circuit 102 may access the memory 104 and execute the codes stored in the memory 104, for example, by using the corresponding programming as will be well understood by those skilled in the art. In some embodiments, the memory 104 may be integral to the control circuit 102 or may be physically discrete in whole or in part from the control circuit 102 as desired. This memory 104 may also be local with respect to the control circuit 102 (where, for example, both share a common circuit board, chassis, power supply, and/or housing) or may be partially or wholly remote with respect to the control circuit 102 (where, for example, the memory 104 is physically located in another housing or remotely location). In some embodiments, the memory 104 may be distributed in multiple locations.

FIG. 2A is a flowchart depicting a method 200 for item recommendation in accordance with some embodiments. The method 200 may be performed using the system 100 in accordance with the approaches described above. Although the method 200 is mainly illustrated with the system 100, the method 200 may also be performed with a system differently configured.

Figure 2B:
FIG. 2B is a flowchart depicting a method to generate an item recommendation model in accordance with some embodiments.
Figure 2B:
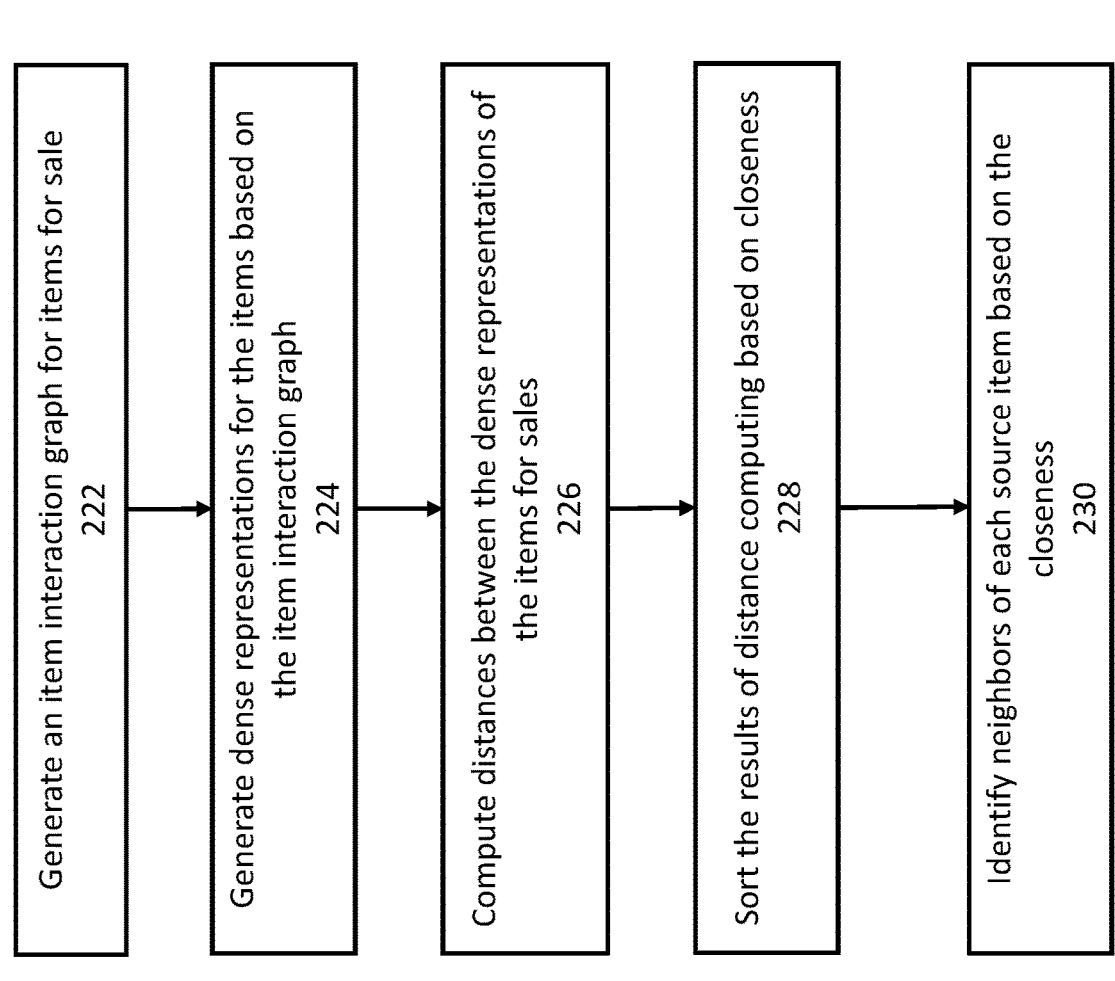

In step 202, the control circuit 102 may generate an item recommendation model 110. FIG. 2B illustrates a method to generate the item recommendation model 110 in step 202 in accordance with some embodiments. FIGS. 3-6 are illustrations to describe generating the item recommendation model 110 in accordance with some embodiments. Referring to FIG. 2B, in step 222, to generate the item recommendation model 110, the control circuit 102 may generate, based on the item selection data 108, an item interaction graph.

Figure 3:
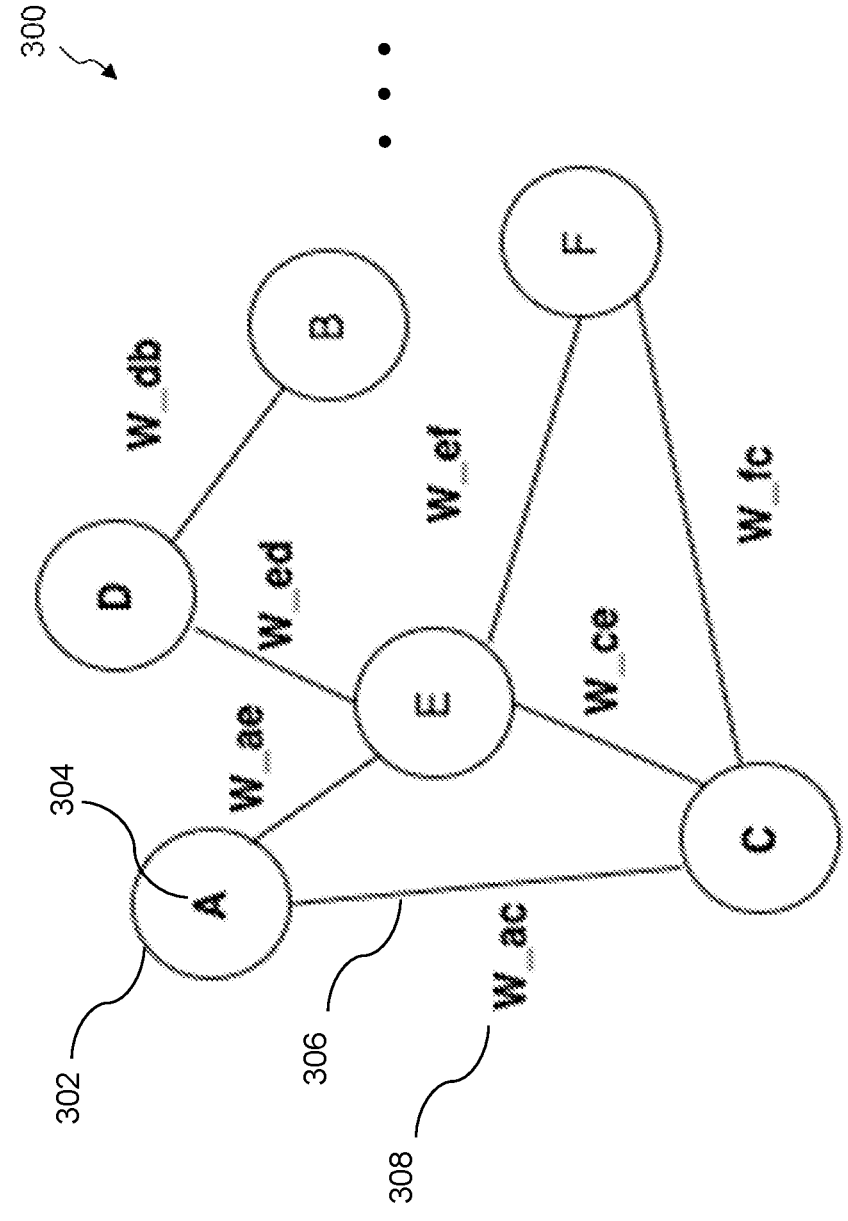
FIG. 3 is a simplified illustration of an item interaction graph in accordance with some embodiments.

FIG. 3 is a simplified illustration of an item interaction graph 300 in accordance with some embodiments. In some embodiments, the item interaction graph 300 may include a plurality of nodes 302, a plurality of edges 306, and a plurality of edge weights 308. Each node 302 of the item interaction graph 300 may correspond to each item 304 for sale in the retail facility. In FIG. 3, each letter (A, B, C, D, E, F) 204 may refer to a specific item for sale in the retail facility. Each edge 306 may connect two nodes of the item interaction graph 300. In some embodiments, an edge between two nodes exists when at least one record in the item selection data 108 indicates that two items corresponding to the two nodes are selected for the same shopping cart. In some embodiments, there is no edge between two nodes, when there is no record in the item selection data 108 indicating that two items corresponding to the two nodes are selected for the same shopping cart. In some embodiments, the shopping cart may be shopping cart software of the shopping application 126 that allows users of the shopping application 126 to save/reserve the list of products to be purchased. The plurality of edge weights 308 may correspond to the plurality of edges 306. Each edge 306 may have one edge weight 308 corresponding to each edge 306. The edge weights may be related to item selection sequence of the items for sale in the retail facility. In some embodiments, the edge weights 308 may be associated with rates of occurrences where a selection sequence gap between two items is within a predetermined selection sequence gap when the two items are selected for the same shopping cart. In some embodiments, the edge weights 308 may be associated with rates of occurrences of successive selections of two items when the two items are selected for the same shopping cart.

In some embodiments, to generate the item interaction graph 300, the control circuit 102 may generate the plurality of nodes, each node corresponding to each item for sale in the retail store. The control circuit 102 may then generate the plurality of edges, each edge connecting two nodes when at least one record in the item selection data 108 indicates that two items corresponding to the two nodes are selected for the same shopping cart. Then, the control circuit 102 may calculate, based on the item selection sequences of items selected for the same shopping cart, the plurality of edge weights 308. In some embodiments, the edge weights 308 may be calculated with the following Equation 1:

$$EdgeWeight(A, B) = \frac{Successive(A, B)}{Co-occurence(A, B)}$$

In Equation 1, EdgeWeight (A, B) refers to an edge weight assigned to an edge connecting two nodes corresponding to item A and item B; Successive (A, B) refers to a visit count where item A and item B are successively selected for the same shopping cart (i.e., the selection sequence of item A and item B is +1 or −1); and Co-occurrence (A, B) refers to a visit count where item A and item B are part of the same shopping cart by being selected for the same shopping cart. In some embodiments, Successive (A, B) may refer to a visit count where item A and item B are selected within a predetermined selection sequence gap (or window). The predetermined selection sequence gap (or window) may be tunable. In some embodiments, the predetermined selection sequence gap (or window) may be bigger than 1. For example, when the predetermined selection sequence gap is 2, Successive (A, B) in Equation 1 may be a visit count where the selection sequence of item A and item B is within +2 and −2.

In some embodiments, when Successive (A, B) is 0, the control circuit 102 may assign a small default value set up as a static value to the edge 306 connecting the nodes 302 corresponding to item A and item B as an edge weight 308. When Co-occurrence (A, B) is 0, there may be no edge 306 connecting nodes 302 corresponding to item A and item B.

Figure 4:
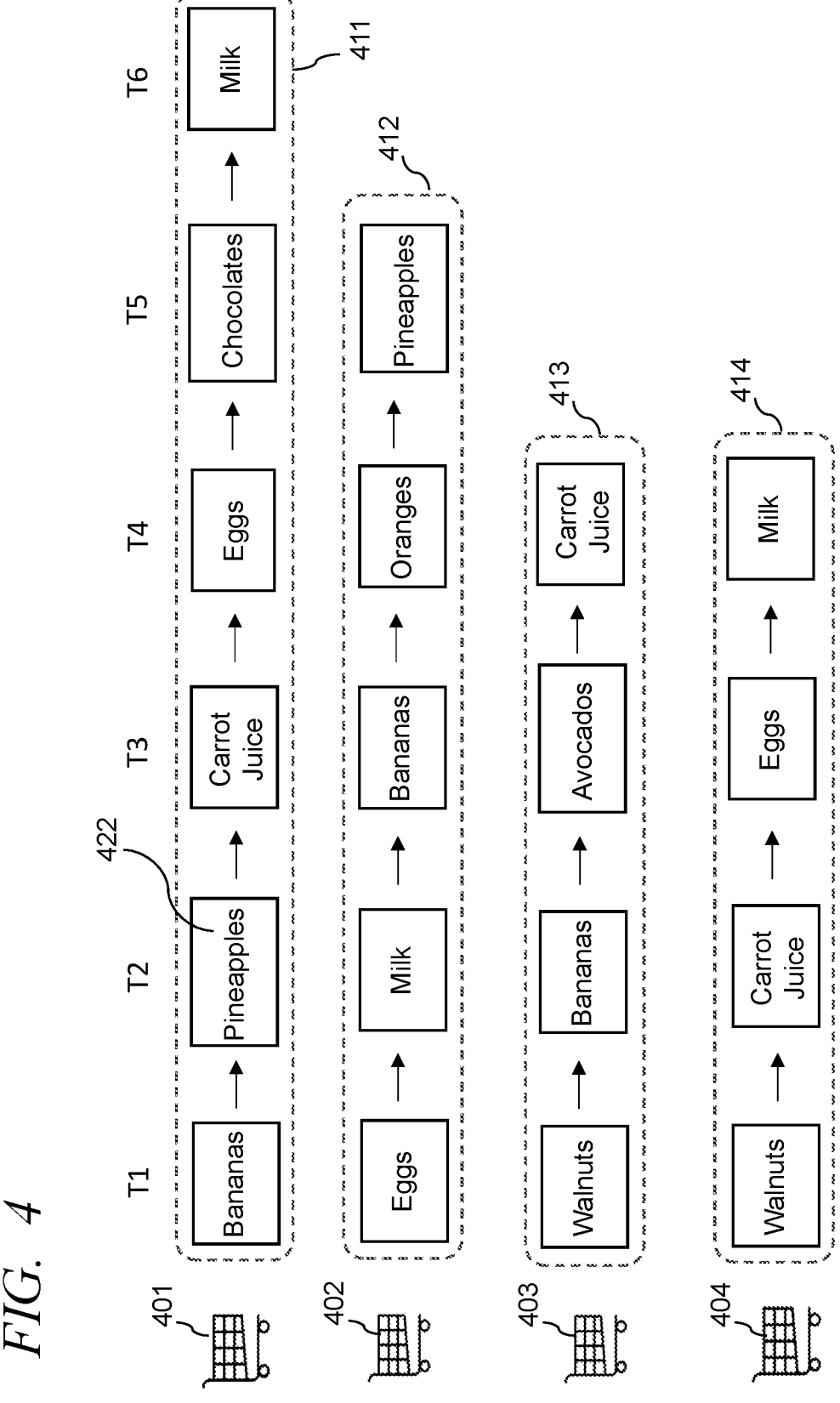
FIG. 4 depicts an example item selection sequence in accordance with some embodiments.
Figure 5:
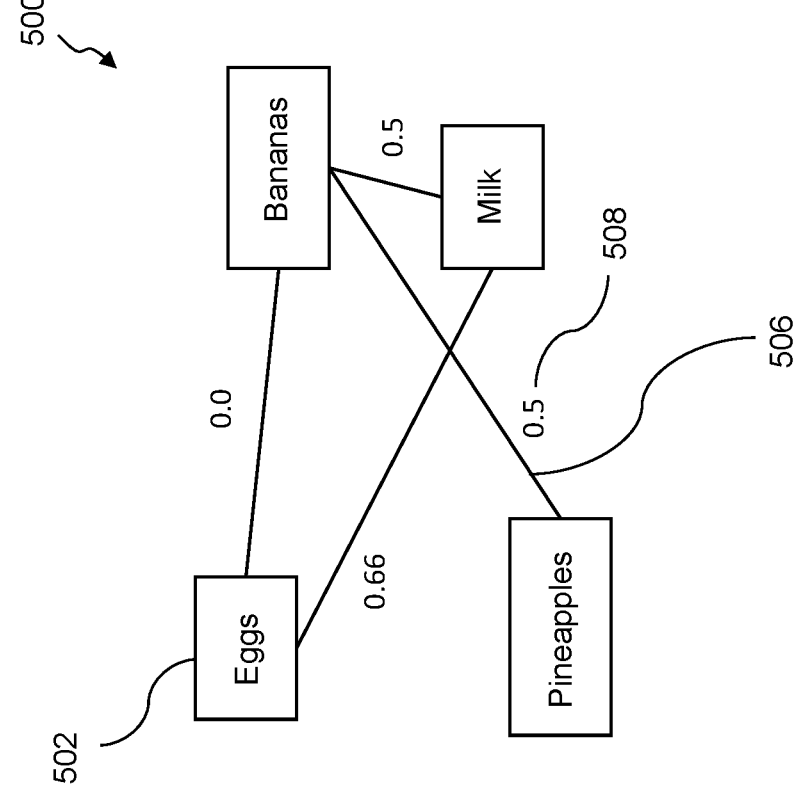
FIG. 5 is a simplified item interaction graph for eggs, bananas, pineapples, and milk generated based on FIG. 4 in accordance with some embodiments.

FIGS. 4 and 5 are illustrations of an example of the edges 306 and the edge weights 308 of the item interaction graph 300. FIG. 4 depicts items 422 selected for each shopping cart 401, 402, 403, 404 and time sequences of item selections for each shopping cart 401, 402, 403, 404. In FIG. 4, items 422 in block 411 are selected for shopping cart 401, items 422 in block 412 are selected for shopping cart 402, items 422 in block 413 are selected for shopping cart 403, items in block 414 are selected for shopping cart 404. In FIGS. 4, T1 to T6 indicate item selection sequences (starting from T1 to T6) generated based on the time stamp information associated with the item selection. In FIG. 4, each shopping cart 401, 402, 403, 404 indicates different visits.

FIG. 5 illustrates an item interaction graph 500 for eggs, bananas, Pineapples, and milk generated based on the item selections described in FIG. 4 and using Equation 1. Although in FIG. 5, Successive (A, B) used in Equation 1 is a visit count where item A and item B are successively selected for the same shopping cart (i.e., the selection sequence of item A and item B is +1 or −1), as mentioned earlier, the selection sequence gap (or window) for Successive (A, B) may be tunable. The item interaction graph 500 includes nodes 502 for eggs, bananas, pineapples, and milk. The item interaction graph 500 also includes edges 506 connecting two nodes 502 of the graph 500 and edge weights 508 assigned to each edge 506.

For example, in FIG. 4, Co-occurrence (bananas, eggs) is 2 because bananas and eggs are part of shopping cart 401 and shopping cart 402, and Successive (bananas, eggs) is 0 because for neither shopping cart 401 nor shopping cart 402, bananas and eggs are successively selected. Therefore, the edge weight 508 for the edge 506 connecting bananas and eggs in FIG. 5 is 0. With respect to milk and pineapples, in FIG. 4, there is no visit count where milk and pineapples are part of the same shopping cart. Therefore, in FIG. 5, an edge 506 does not exist between the nodes 502 for milk and pineapples. Further, in FIG. 4, Co-occurrence (bananas, pineapples) is 2 because bananas and pineapples are part of shopping cart 401 and shopping cart 402, and Successive (bananas, pineapples) is 1 because bananas and pineapples are successively selected (T1, T2) for shopping cart 401 but not successively selected (T3, T5) for shopping cart 402. Therefore, the edge weight 508 for the edge 506 connecting the nodes 502 for bananas and pineapples in FIG. 4 is 0.5.

Figure 6:
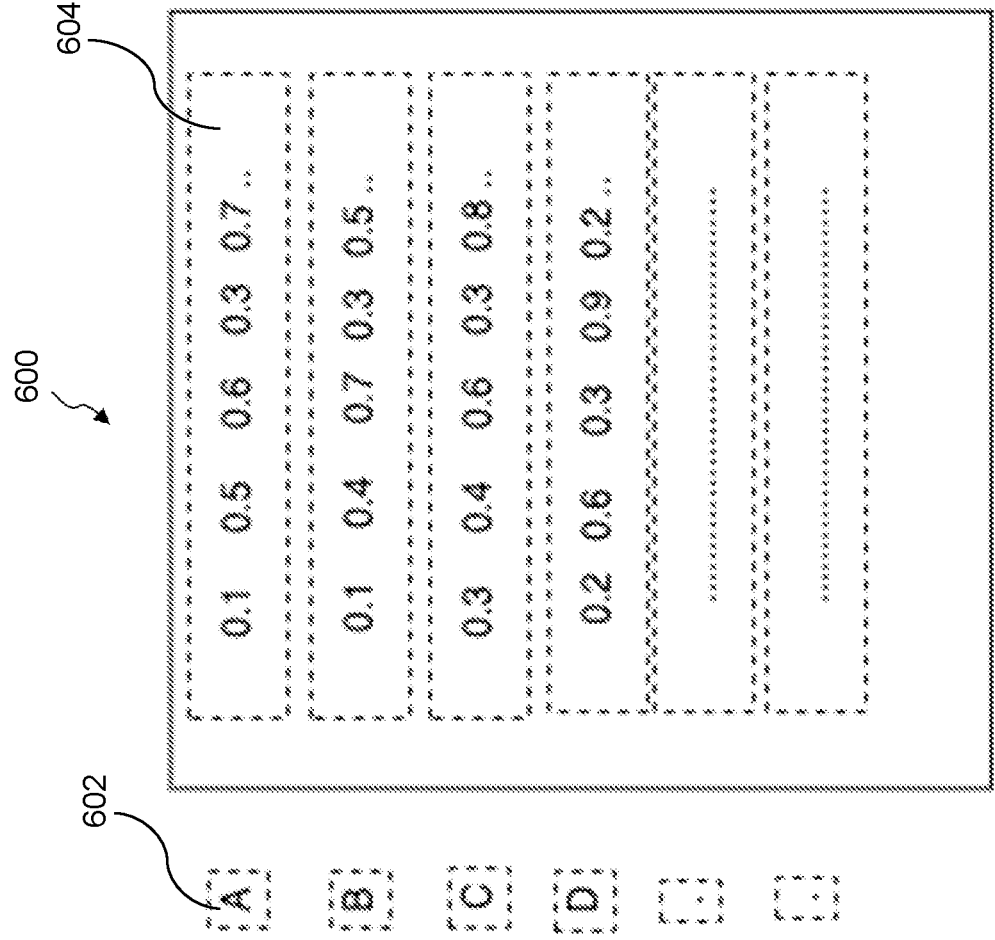
FIG. 6 is a simplified illustration of dense representations for items in accordance with some embodiments.

Referring to FIG. 2B, in step 224 the control circuit 102 may generate dense representations for the items for sales in the retail store based on the item interaction graph 300. FIG. 6 is a simplified illustration of dense representations 600 in accordance with some embodiments. In some embodiments, the control circuit 102 may generate the dense representations for the items for sale in the retail store based on the nodes 302 of the item interaction graph 300 and the relationship of the nodes 302. In some embodiments, the dense representations 600 for the items may be generated by an embedding process where an embedding layer converts the item interaction graph 300 into multi-dimensional dense vectors 604 for the items 602. The dimension of the dense vectors (i.e., embedding dimension) may be predetermined based on the desired size of the item recommendation model 110. A higher embedding dimension may generate an item recommendation model 110 with a greater size. In some embodiments, the value of the predetermined embedding dimension may be, but is not limited to, 4, 8, 16, 32, 64, 128 or 256.

In some embodiments, the dense representations 600 for the items may comprise source representations for the items and target representations for the items. The source representations for items may be dense vectors for the items when the nodes of the items act as a source (i.e., source node). The target representations for items may be dense vectors for the item when the nodes of the items act as a destination/target from the source (i.e., destination nodes/target nodes). For example, when traversing each node of the item interaction graph 300 is from node A to node C, node A acts as a source node and node C acts as a destination node.

In some embodiments, the dense representations 600 for the items 602 may be generated at least by a representation learning process to find dense representations 600 having a minimum value of a pairwise loss. The minimization of loss may be carried out within each iteration of the node within the epoch. In some embodiments, the pairwise loss of the dense representations 600 may be calculated at least by subtracting a mean distance between a source representation of an item of a source node and target representations of positive target items from a mean distance between the source representation of the item of the source node and target representations of negative target items. The positive target items and the negative target items may be determined based on the reachability from the source node. The positive target items may be selected from the nodes directly connected to the source node with a single edge. The positive target items may be selectively sampled based on edge weights of edges connected to the source node. The negative target items may be randomly selected/sampled from nodes that are not directly connected to the source node by an edge.

In some embodiments, the pairwise loss may be calculated with the following Equation 2:

$$PairwiseLoss = meanDistance(P, [Q+]) - meanDistance(P, [Q-])$$

In Equation 2, P indicates a source representation for an item of a source node, [Q+] indicates target representations of positive target items from the source node, and [Q−] indicates target representations of negative target items from the source node.

When the pairwise loss is lesser, the dense representations for the positive target items are closer to the dense representation for the source item compared to the dense representations for the negative target nodes to the dense representation for the source item. In some embodiments, the control circuit 102 may use Euclidean to calculate the distance between the dense representations of items.

Referring to FIG. 2B, after generating the dense representations, in step 226 the control circuit 102 may compute distances between the dense representations of the items for sales. The control circuit 102 may take a source representation of an item for any source nodes and compute the distances from the source item to target representations for all items for sale in the retail facility. All items for sale in the retail facility may correspond to all items in a catalog of the retail facility. In some embodiments, in step 228, the control circuit 102 may sort the results of distance computing based on closeness. In some embodiments, in step 230, the control circuit 102 may identify neighbors of each source item based on the closeness of the computed distances to generate the item recommendation model 110. In some embodiments, the control circuit 102 may identify the predetermined number of top items close to each source item as neighbors of the each source item. In some embodiments, the control circuit

102 may identify the approximate nearest neighbors of each source item with, but not limited to, an ANNOY (Approximate Nearest Neighbors Oh Yeah) library. The generated item recommendation model 110 may be stored in the memory 104. In some embodiments, the memory 104 may be a memory of the backend system 114.

Referring back to FIG. 2A, in step 204, the control circuit 102 may receive an indication of an item selection from a user in a retail facility. In some embodiments, the control circuit 102 may receive the indication of the item selection from the edge device 112 via a shopping application 126 stored on a memory 124 of the edge device 112 and executed by a processor 122 of the edge device 112.

In step 206, the control circuit 102 may access the item recommendation model 110 trained using the dense representations for the items for sale in a retail facility. The dense representations used to train the item recommendation model 110 may be based on an item interaction graph.

In step 208, the control circuit 102 may generate a recommendation for one or more suggested next items based on using the received indication of the item selection as an input of the item recommendation model 110. The one or more suggested next items may be the one or more next best items for recommendation. The item recommendation model 110 may return one or more top neighbor items of the selected item as a recommendation for one or more suggested next items based on the closeness to the selected item.

In step 210, the control circuit 102 may cause the one or more suggested next items identified with the item recommendation model 110 to be presented to the user for potential selection. The one or more suggested next items may be presented via the user output mechanism 118 (e.g., display device of the user's mobile electronic device). In some embodiments, the one or more suggested next items may be presented in the form of a ranked list of the next best items.

FIG. 7 is a flowchart depicting an exemplary method 700 for item recommendation in accordance with some embodiments. The method 700 may be performed using the system 100 in accordance with the approaches described above. Although the method 700 is mainly illustrated with the system 100, the method 700 may also be performed with a system differently configured.

In step 702, the control circuit 102 may store the generated item recommendation model 110 to a memory 104 of the system 100. In some embodiments, the memory 104 storing the item recommendation model 110 in step 702 may be a memory of a backend system 114. In some embodiments, the memory 104 storing the item recommendation model 110 may be a cloud server.

In optional approaches, in step 704, the control circuit 102 may convert the generated item recommendation model 110 to a reduced format to further reduce size of the item recommendation model 110 to store in the edge device 112. For example, the control circuit 102 may convert the trained item recommendation model 110 to a TensorFlow Life format. In some embodiments, without conversion of the format of the item recommendation model 110, the size of the item recommendation model 110 may be small enough to store in the edge device 112. For example, when the embedding dimension for the dense representations 600 is 8, the size of the item recommendation model 110 generated using the dense representations 600 with the embedding dimension of 8 for 10,000 items may be 320 kilobytes (320 KB).

In step 706, the control circuit 102 may receive an indication of an item selection from a user in a retail facility. In some embodiments, the control circuit 102 may receive the indication of the item selection via the shopping application 126 stored on a memory 124 of the edge device 112 and executed by a processor 122 of the edge device 112.

In step 708, the control circuit 102 may transmit, for storage in the edge device 112 executing the shopping application 126, the item recommendation model 110 or the item recommendation model 110 in the reduced format. In some embodiments, the control circuit 102 may transmit the generated item recommendation model 110 to the edge device 112 and the item recommendation model 110 stored in the edge device 112 may be the same size as the item recommendation model 110 stored in the memory 104. When the control circuit 102 converts the item recommendation model 110 to the reduced format, the control circuit 102 transmits the reduced format of the item recommendation model 110 in. In this case, the size of the item recommendation model 110 stored in the edge device 112 may be lesser than the size of the item recommendation model 110 stored in the memory 104. In some embodiments, the control circuit 102 may transmit the reduced format of item recommendation model 110, for storage in the edge device 112, to a model storage server 140 (for example, a Firebase Could) and the edge device 112 may download the reduced item recommendation model 110 from the model storage server 140 when the edge device 112 makes a first recommendation call or newer version of the item recommendation model 110 is available in the model storage server 140. In some embodiments, the edge device 112 may download the reduced item recommendation model 110 before the edge device 112 makes a first recommendation call.

In step 710, the control circuit 102 may monitor an online traffic of a backend system 114. For example, the online traffic may be high when calls to the backend system 114 are made often or when the transaction data is dense. The control circuit 102 may determine whether the monitored online traffic of the backend system 114 is the higher than a threshold value for the online traffic.

In step 712, when the monitored online traffic of the backend system 114 is the same as or lower than the threshold value for the online traffic, the control circuit 102 may generate, using the item recommendation model 110 stored in the memory 104 of the backend system 114, a recommendation for one or more suggested next items for the user to consider selecting based on using the received indication of the item selection as an input of the item recommendation model 110. The item recommendation model 110 may return one or more top neighbor items as a recommendation for one or more suggested next items based on the closeness to the selected item.

In step 714, when the monitored online traffic of the backend system 114 is higher than the threshold value for the online traffic, the control circuit 102 may cause, in response to detection of the moline traffic higher than the threshold value, the shopping application 126 executed on the edge device 112 to generate, using the item recommendation model 110 stored in the edge device 112, a recommendation for one or more suggested next items for display on a graphical user interface of the shopping application 126 for the user to consider selecting based on using the received indication of the item selection as an input of the item recommendation model 110. When the edge device 112 is the mobile electronic device, the control circuit 102 may cause the mobile shopping application executed on the mobile electronic device to generate, using the item recommendation model 110 stored in the memory of the mobile electronic device, a recommendation one or more suggested next items for display on a graphical user interface of the mobile shopping application for the user to consider selecting.

In some embodiments, a system for item recommendation may include a memory storing an item recommendation model trained using dense representations for items for sale in a retail facility, the dense representations generated based on an item interaction graph including nodes corresponding to items for sale in a retail facility, edges connecting the nodes, and edge weights for the edges, wherein the edge weights are related to item selection sequence of the items for sale in the retail facility, and a control circuit coupled to the memory, the control circuit configured to receive an indication of an item selection by a user in the retail facility, generate a recommendation for a suggested next item based on using the item selection as an input of the item recommendation model, and cause the suggested next item to be presented to the user for potential selection.

In some embodiments, a method for item recommendation may include receiving an indication of an item selection by a user in a retail facility, accessing an item recommendation model stored in a memory, the item recommendation model trained using dense representations for items for sale in the retail facility, the dense representations generated based on an item interaction graph including nodes corresponding to items for sale in the retail facility, edges connecting the nodes, and edge weights for the edges, wherein the edge weights are related to item selection sequence of the items for sale in the retail facility, generating a recommendation for a suggested next item for the user to consider selecting based on using the item selection as an input of the item recommendation model, and causing the suggested next item to be presented to the user for potential selection.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for item recommendation, the system comprising:

a memory storing an item recommendation model trained using dense representations for a set of items for sale in a retail facility, the dense representations generated based on an item interaction graph comprising nodes corresponding to the set of items for sale in a retail facility, edges connecting the nodes, and edge weights for the edges, wherein the edge weights are related to item selection sequence of the set of items for sale in the retail facility, the item interaction graph generated at least by:

assigning each of the set of items for sale in the retail facility to each of the nodes;

connecting, with an edge, two nodes corresponding to two items selected for a shopping cart; and calculating, based on the item selection sequence of the two items, an edge weight for the edge; and a control circuit coupled to the memory, the control circuit configured to:

receive an indication of an item selection by a user in the retail facility;

generate a recommendation for a suggested next item based on using the item selection as an input of the item recommendation model;

cause the suggested next item to be presented to the user for potential selection;

transmit, for storage in an edge device executing a shopping application, the item recommendation model;

monitor an online traffic of a backend system; and cause, in response to detection of the online traffic higher than a threshold value, the shopping application executed on the edge device to generate, using the item recommendation model stored in the edge device, a recommendation for a suggested next item for display on a graphical user interface of the shopping application for a customer to consider selecting.

2. The system of claim 1, wherein the edge weights are associated with rates of occurrences where a selection sequence gap of two items is within a predetermined selection sequence gap when the two items are selected for a same shopping cart.

3. The system of claim 1, wherein the edge weights are associated with rates of occurrences of successive selections of two items when the two items are selected for a same shopping cart.

4. The system of claim 1, wherein an edge between two nodes is generated when at least one record in item selection data indicates that two items corresponding to the two nodes are selected for a same shopping cart.

5. The system of claim 1, wherein the dense representations comprise source representations for items when the nodes of the items act as source nodes and target representations when the nodes for the items are target nodes.

6. The system of claim 1, wherein the dense representations are generated at least by representation learning to find dense representations having a minimum value of a pairwise loss.

7. The system of claim 6, wherein the pairwise loss of the dense representations is calculated at least by subtracting a mean distance between a source representation of an item of a source node and target representations of positive target items from a mean distance between the source representation of the item of the source node and target representations of negative target items, wherein the positive target items are selected based on edge weights of edges connected to the source node, and the negative target items are randomly selected from nodes that are not directly connected to the source node by an edge.

8. The system of claim 1, wherein the item recommendation model is trained, using the dense representations for the set of items for sale in the retail facility, at least by:

computing a computed set of distances between the dense representations of the set of items; and identifying neighbors of each of the set of items based on the computed set of distances between the dense representations of the set of items.

9. A method for item recommendation, the method comprising:

assigning each of a set of items for sale in a retail facility to each of a set of nodes;

connecting, with an edge, two nodes corresponding to two items selected for a shopping cart; and calculating, based on an item selection sequence of the two items, an edge weight for the edge;

receiving an indication of an item selection by a user in the retail facility;

accessing an item recommendation model stored in a memory, the item recommendation model trained using dense representations for a set of items for sale in the retail facility, the dense representations generated based on an item interaction graph comprising nodes corresponding to the set of items for sale in the retail facility, edges connecting the nodes, and edge weights for the edges, wherein the edge weights are related to an item selection sequence of the set of items for sale in the retail facility;

generating a recommendation for a suggested next item for the user to consider selecting based on using the item selection as an input of the item recommendation model;

causing the suggested next item to be presented to the user for potential selection;

transmitting, for storage in an edge device executing a shopping application, the item recommendation model;

monitoring an online traffic of a backend system; and causing, in response to detection of the online traffic higher than a threshold value, the shopping application executed on the edge device to generate, using the item recommendation model stored in the edge device, a recommendation for a suggested next item for display on a graphical user interface of the shopping application for a customer to consider selecting.

10. The method of claim 9, wherein the edge weights are associated with rates of occurrences where a selection sequence gap of two items is within a predetermined selection sequence gap when the two items are selected for a same shopping cart.

11. The method of claim 9, wherein the edge weights are associated with rates of occurrences of successive selections of two items when the two items are selected for a same shopping cart.

12. The method of claim 9, wherein an edge between two nodes is generated when at least one record in item selection data indicates that two items corresponding to the two nodes are selected for a same shopping cart.

13. The method of claim 9, wherein the dense representations comprise source representations for the set of items when the nodes of the set of items act as source nodes and target representations for the set of items when the nodes for the set of items are destination nodes.

14. The method of claim 9, wherein the dense representations are generated at least by representation learning to find dense representations having a minimum value of a pairwise loss.

15. The method of claim 14, wherein the pairwise loss of the dense representations is calculated at least by subtracting a mean distance between a source representation of an item of a source node and target representations of positive target items from a mean distance between the source representation of the item of the source node and target representations of negative target items, wherein the positive target items are selected based on edge weights of edges connected to the source node, and the negative target items are randomly selected from nodes that are not directly connected to the source node by an edge.

16. The method of claim 9, wherein the item recommendation model is trained, using the dense representations for the set of items for sale in a retail facility, at least by:

computing a computed set of distances between the dense representations of the set of items; and identifying neighbors of each of the set of items based on the computed set of distances between the dense representations of the set of items.

* * * * *